United States Patent
Ejima et al.

(10) Patent No.: US 11,598,437 B2
(45) Date of Patent: Mar. 7, 2023

(54) CAPACITY CONTROL VALVE

(71) Applicant: Eagle Industry Co., Ltd., Tokyo (JP)

(72) Inventors: Takahiro Ejima, Tokyo (JP); Kohei Fukudome, Tokyo (JP); Keigo Shirafuji, Tokyo (JP); Kenshiro Furukawa, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 17/433,558

(22) PCT Filed: Feb. 27, 2020

(86) PCT No.: PCT/JP2020/007953
§ 371 (c)(1),
(2) Date: Aug. 24, 2021

(87) PCT Pub. No.: WO2020/179597
PCT Pub. Date: Sep. 10, 2020

(65) Prior Publication Data
US 2022/0154837 A1    May 19, 2022

(30) Foreign Application Priority Data
Mar. 1, 2019   (JP) .............................. JP2019-037960

(51) Int. Cl.
*F16K 17/04* (2006.01)
*G05D 7/00* (2006.01)
(Continued)

(52) U.S. Cl.
CPC ...... *F16K 17/0473* (2013.01); *F16K 17/0486* (2013.01); *G05D 7/005* (2013.01);
(Continued)

(58) Field of Classification Search
CPC .............. F04B 27/1804; F04B 27/18; F04B 2027/1827; F04B 2027/1831; F04B 2027/1813; F04B 2027/1845
See application file for complete search history.

(56) References Cited

U.S. PATENT DOCUMENTS

| 6,010,312 A | 1/2000 | Suitou et al. ............. F04B 1/26 |
| 6,354,811 B1 | 3/2002 | Ota et al. .................. 417/222.2 |

(Continued)

FOREIGN PATENT DOCUMENTS

| EP | 1081378 | 3/2001 | ............. F04B 27/18 |
| EP | 2594794 | 5/2013 | ............. F04B 27/18 |

(Continued)

OTHER PUBLICATIONS

International Search Report and Written Opinion issued in PCT/JP2019/002207, dated Apr. 23, 2019, with English translation, 13 pages.

(Continued)

*Primary Examiner* — Robert K Arundale
(74) *Attorney, Agent, or Firm* — Hayes Solo Way P.C.

(57) ABSTRACT

A capacity control valve includes a valve housing discharge, port, a suction port, and control ports, and a valve element to be brought into contact with and separated from a valve seat by a driving force of a solenoid to open and close a communication between the control and discharge ports or communication between the control port and the suction port. A sliding region is formed by an inner peripheral surface of the valve housing and an outer peripheral surface of the valve element, a groove extending in a circumferential direction is formed in at least one of the housing inner peripheral surface of the valve housing and the outer peripheral surface of the valve element, and the sliding region has a structure in which a swirling current is generated in the groove by fluid flowing from a high-pressure side to a (Continued)

low-pressure side in a clearance between the inner peripheral surface and the outer peripheral surface of the valve element.

8 Claims, 9 Drawing Sheets

(51) Int. Cl.
    *F04B 27/18*     (2006.01)
    *F16K 31/06*     (2006.01)

(52) U.S. Cl.
    CPC ........... *F04B 27/18* (2013.01); *F04B 27/1804* (2013.01); *F16K 31/0613* (2013.01)

(56) References Cited

U.S. PATENT DOCUMENTS

| | | | |
|---|---|---|---|
| 6,358,017 B1 | 3/2002 | Ota et al. | 417/222.2 |
| 6,361,283 B1 | 3/2002 | Ota et al. | 417/222.2 |
| 6,485,267 B1 | 11/2002 | Imai et al. | F04B 1/26 |
| 8,021,124 B2 | 9/2011 | Umemura et al. | 417/222.2 |
| 8,079,827 B2 | 12/2011 | Iwa et al. | 417/222.2 |
| 9,732,874 B2 | 8/2017 | Saeki | F04B 27/1804 |
| 9,777,863 B2 | 10/2017 | Higashidozono | F04B 27/1804 |
| 11,053,933 B2 | 7/2021 | Warren | F04B 27/1804 |
| 11,085,431 B2 | 8/2021 | Fukudome | F04B 27/18 |
| 11,156,301 B2 | 11/2021 | Hayama | F16K 31/06227 |
| 2004/0060604 A1 | 4/2004 | Uemura et al. | 137/595 |
| 2005/0035321 A1 | 2/2005 | Uemura | F16K 27/041 |
| 2005/0287014 A1 | 12/2005 | Umemura | F04B 27/1804 |
| 2006/0218953 A1 | 10/2006 | Hirota | 62/228.5 |
| 2007/0214814 A1 | 9/2007 | Umemura et al. | 62/228.1 |
| 2008/0138213 A1 | 6/2008 | Umemura | F04B 27/1804 |
| 2009/0108221 A1 | 4/2009 | Umemura | F04B 27/1804 |
| 2009/0183786 A1 | 7/2009 | Iwa et al. | 137/487.5 |
| 2012/0198992 A1 | 8/2012 | Futakuchi et al. | 91/505 |
| 2012/0198993 A1 | 8/2012 | Fukudome et al. | F04B 27/18 |
| 2013/0126017 A1 | 5/2013 | Ota et al. | F04B 27/1804 |
| 2014/0130916 A1 | 5/2014 | Saeki | F04B 27/1804 |
| 2015/0004010 A1 | 1/2015 | Saeki | F04B 27/1804 |
| 2015/0068628 A1 | 3/2015 | Iwa et al. | F16K 31/06 |
| 2015/0211506 A1 | 7/2015 | Shirafuji et al. | F04B 27/1804 |
| 2015/0345655 A1 | 12/2015 | Higashidozono et al. | F16K 31/0624 |
| 2016/0290326 A1 | 10/2016 | Sugamura | F04B 27/1804 |
| 2017/0175726 A1 | 6/2017 | Kume | F04B 27/1804 |
| 2017/0028462 A1 | 10/2017 | Hayama et al. | F16K 47/06 |
| 2017/0284562 A1* | 10/2017 | Hayama | F16K 41/00 |
| 2017/0356430 A1 | 12/2017 | Irie et al. | F04B 27/1804 |
| 2018/0291888 A1 | 10/2018 | Tonegawa | F16K 31/0624 |
| 2020/0362974 A1 | 11/2020 | Hayama | F04B 49/22 |
| 2021/0285433 A1 | 9/2021 | Hayama | F04B 27/1804 |
| 2022/0034414 A1 | 2/2022 | Ito | F04B 27/18 |

FOREIGN PATENT DOCUMENTS

| | | | |
|---|---|---|---|
| EP | 2784320 | 10/2014 | F04B 27/18 |
| EP | 3431760 | 1/2019 | F04B 27/18 |
| JP | 5-306679 | 11/1993 | F04B 27/08 |
| JP | 6-200875 | 7/1994 | F04B 27/08 |
| JP | 7-27049 | 1/1995 | F04B 27/10 |
| JP | 9-144929 | 6/1997 | F16K 31/06 |
| JP | 2000-345961 | 12/2000 | F04B 27/14 |
| JP | 2001-73939 | 3/2001 | F04B 27/14 |
| JP | 2001-132632 | 5/2001 | F04B 27/14 |
| JP | 2003-42062 | 2/2003 | F04B 27/14 |
| JP | 2006-52648 | 2/2006 | F04B 27/14 |
| JP | 2006-307828 | 11/2006 | F04B 27/14 |
| JP | 2007-247512 | 9/2007 | F04B 27/14 |
| JP | 2008-14269 | 1/2008 | F04B 27/14 |
| JP | 2008-202572 | 9/2008 | F04B 27/14 |
| JP | 4242624 | 1/2009 | F04B 49/00 |
| JP | 2011-32916 | 2/2011 | F04B 27/14 |
| JP | 4700048 | 3/2011 | F04B 49/00 |
| JP | 5167121 | 12/2012 | F04B 27/14 |
| JP | 2014-118939 | 6/2014 | F04B 27/14 |
| JP | 5557901 | 6/2014 | F04B 27/14 |
| JP | 2014-190247 | 10/2014 | F04B 27/14 |
| JP | 2016-196876 | 11/2016 | F04B 27/18 |
| JP | 2017-129042 | 7/2017 | F04B 27/18 |
| JP | 6206274 | 10/2017 | F04B 27/18 |
| JP | 2017-223348 | 12/2017 | F16K 11/10 |
| JP | 2018-21646 | 2/2018 | F16K 31/06 |
| JP | 2018-40385 | 3/2018 | F16K 31/06 |
| JP | 2018-145877 | 9/2018 | F04B 39/14 |
| JP | 2019-2384 | 1/2019 | F04B 27/18 |
| WO | WO200711930 | 10/2007 | F04B 27/14 |
| WO | WO2011021789 | 2/2011 | F04B 27/14 |
| WO | WO2011135911 | 11/2011 | F04B 27/14 |
| WO | WO2013109005 | 7/2013 | F04B 49/06 |
| WO | WO2013176012 | 11/2013 | F04B 27/14 |
| WO | WO2014091975 | 6/2014 | F04B 27/14 |
| WO | WO2014119594 | 8/2014 | F04B 27/14 |
| WO | WO2016104390 | 6/2016 | F16K 31/06 |
| WO | WO2017057160 | 4/2017 | F04B 27/18 |
| WO | WO2017159553 | 9/2017 | F04B 27/18 |
| WO | WO2018207461 | 11/2018 | F04B 27/18 |
| WO | WO2019167912 | 9/2019 | F04B 27/18 |

OTHER PUBLICATIONS

International Preliminarry Report on Patentability issued in PCT/JP2019/002207, dated Jul. 28, 2020, 7 pages.
International Search Report and Written Opinion issued in PCT/JP2019/005200, dated Apr. 23, 2019, with English translation, 12 pages.
International Prelimimary Report on Patentability issued in PCT/JP2019/005200, dated Aug. 18, 2020, 7 pages.
International Search Report and Written Opinion issued in PCT/JP2019/007187, dated Apr. 23, 2019, with English translation, 16 pages.
International Prelimiary Report on Patentability issued in PCT/JP2019/007187, dated Sep. 3, 2020, 8 pages.
International Search Report and Written Opinion issued in PCT/JP2019/020196, dated Aug. 27, 2019, with English translation, 11 pages.
International Preliminary Report on Patentability issued in PCT/JP2019/020196, dated Nov. 24, 2020, with English translation, 6 pages.
International Search Report and Written Opinion issued in PCT/JP2019/005199, dated Apr. 23, 2019, with English translation, 12 pages.
International Preliminary Report on Patentability issued in PCT/JP2019/005199, dated Aug. 18, 2020, 4 pages.
International Search Report and Written Opinion issued in PCT/JP2019/027112, dated Oct. 15, 2019, with English translation, 10 pages.
International Preliminary Report on Patentability issued in PCT/JP2019/027112, dated Jan. 19, 2021, 4 pages.
International Search Report and Written Opinion issued in PCT/JP2019/027071, dated Oct. 15, 2019, with English translation, 12 pages.
International Preliminary Report on Patentability issued in PCT/JP2019/027071, dated Jan. 12, 2021, 4 pages.
International Search Report and Written Opinion issued in PCT/JP2019/027072, dated Oct. 8, 2019, with English translation, 10 pages.
International Preliminary Report on Patentability issued in PCT/JP2019/027072, dated Jan. 12, 2021, 4 pages.
International Search Report and Written Opinion issued in PCT/JP2019/027073, dated Oct. 15, 2019, with English translation, 10 pages.
International Preliminary Report on Patentability issued in PCT/JP2019/027073, dated Jan. 12, 2021, 4 pages.
International Search Report and Written Opinion issued in PCT/JP2019/031067, dated Oct. 15, 2019, with English translation, 18 pages.

(56) References Cited

OTHER PUBLICATIONS

International Preliminary Report on Patentability issued in PCT/JP2019/031067, dated Feb. 9, 2021, 6 pages.
International Search Report and Written Opinion issued in PCT/JP2019/031068, dated Oct. 15, 2019, with English translation, 13 pages.
International Preliminary Report on Patentability issued in PCT/JP2019/031068, dated Feb. 9, 2021, 5 pages.
International Search Report and Written Opinion issued in PCT/JP2019/031069, dated Oct. 15, 2019, with English translation, 12 pages.
International Preliminary Report on Patentability issued in PCT/JP2019/031069, dated Feb. 9, 2021, 4 pages.
International Search Report and Written Opinion issued in PCT/JP2019/043374, dated Jan. 7, 2020, with English translation, 10 pages.
International Preliminary Report on Patentability issued in PCT/JP2019/043374, dated May 11, 2021, 4 pages.
International Search Report and Written Opinion issued in PCT/JP2019/047192, dated Jun. 11, 2020, with English translation, 15 pages.
International Preliminary Report on Patentability issued in PCT/JP2019/047192, dated Jun. 8, 2021, 4 pages.
International Search Report and Written Opinion issued in PCT/JP2020/001443, dated Mar. 31, 2020, with English translation, 15 pages.
International Preliminary Report on Patentability issued in PCT/JP2020/001443, dated Jul. 29, 2021, 8 pages.
International Search Report and Written Opinion issued in PCT/JP2020/007953, dated Apr. 7, 2020, with English translation, 17 pages.
International Preliminary Report on Patentability issued in PCT/JP2020/007953, dated Sep. 16, 2021, 10 pages.
International Search Report and Written Opinion issued in PCT/JP2020/015181, dated Jun. 16, 2020, with English translation, 11 pages.
International Preliminary Report on Patentability issued in PCT/JP2020/015181, dated Oct. 14, 2021, 5 pages.
International Search Report and Written Opinion issued in PCT/JP2020/015175, dated Jun. 23, 2020, with English translation, 13 pages.
International Preliminary Report on Patentability issued in PCT/JP2020/015175, dated Oct. 14, 2021, 6 pages.
U.S. Official Action issued in related U.S. Appl. No. 17/259,138, dated Jan. 18, 2022, 14 pages.
Notice of Allowance issued in related U.S. Appl. No. 17/287,086, dated Feb. 2, 2022, 7 pages.
US Official Action issued in related U.S. Appl. No. 17/299,285, dated Mar. 31, 2022, 11 pages.
Chinese Official Action issued in related application serial No. 201980044409.4, dated Jan. 26, 2022, with translation, 10 pages.
Chinese Official Action issued in related application serial No. 201980044138.2, dated Mar. 30, 2022, with translation, 9 pages.
Chinese Official Action issued in related application serial No. 201980044077.x. dated Apr. 2, 2022, with translation, 11 pages.
Chinese Official Action issued in related application serial No. 201980046798.4, dated Apr. 6, 2022, with translation, 8 pages.
Chinese Official Action issued in related application serial No. 201980046750.3, dated Apr. 27, 2022, with translation, 10 pages.
Chinese Official Action issued in related application serial No. 201980047614.6, dated Apr. 26, 2022, with translation, 9 pages.
European Search Report issued in related application serial No. 19848099.8, dated Feb. 9, 2022, 7 pages.
European Search Report issued in related application serial No. 19834984.7, dated Feb. 21, 2022, 12 pages.
European Search Report issued in related application serial No. 19833331.2, dated Mar. 30, 2022, 6 pages.
European Search Report issued in related application serial No. 19847690.5, dated Feb. 9, 2022, 5 pages.
European Search Report issued in related application serial No. 19847395.1, dated Feb. 9, 2022, 5 pages.
European Search Report issued in related application serial No. 19834556.3, dated Feb. 17, 2022, 7 pages.
European Search Report issued in related application serial No. 19833028.4, dated Apr. 7, 2022, 8 pages.
European Search Report issued in related application serial No. 19894059.5, dated Jun. 7, 2022, 4 pages.
European Search Report issued in related application serial No. 19883193.5, dated May 23, 2022, 5 pages.
U.S. Official Action issued in related U.S. Appl. No. 178299,285, dated Mar. 31, 2022, 11 pages.
U.S. Official Action issued in related U.S. Appl. No. 17/259,138, dated Apr. 15, 2022, 18 pages.
U.S. Official Action issued in related U.S. Appl. No. 17/259,138, dated Mar. 31, 2022, 5 pages.
U.S. Official Action issued in related U.S. Appl. No. 17/256,955, dated Feb. 18, 2022, 19 pages.
U.S. Official Action issued in related U.S. Appl. No. 17/259,138, dated Jan. 19, 2022, 6 pages.
U.S. Official Action issued in related U.S. Appl. No. 17/256,959, dated May 5, 2022, 18 pages.
U.S. Appl. No. 17/256,953, filed Dec. 29, 2020.
U.S. Appl. No. 17/299,285, filed Jun. 2, 2021.
U.S. Appl. No. 17/256,959, filed Dec. 29, 2020.
U.S. Appl. No. 17/287,086, filed Apr. 20, 2021.
U.S. Appl. No. 17/471,701, filed Jun. 23, 2021.
U.S. Appl. No. 17/258,692, filed Jan. 7, 2021.
U.S. Appl. No. 17/256,955, filed Dec. 29, 2020.
U.S. Appl. No. 17/256,947, filed Dec. 29, 2020.
U.S. Appl. No. 17/2558,708, filed Jan. 7, 2021.
U.S. Appl. No. 17/259,138, filed Jan. 8, 2021.
U.S. Appl. No. 17/66,547, filed Sep. 30, 2021.
U.S. Appl. No. 17/599,539, filed Sep. 28, 2021.
U.S. Official Action issued in related U.S. Appl. No. 17/256,955, dated Aug. 23, 2022, 17 pages.
Www.lexio.com/en/definition/connected accessed Aug. 15, 2022, Year 2022.

* cited by examiner

CAPACITY CONTROL VALVE

TECHNICAL FIELD

The present invention relates to a capacity control valve that variably controls capacity of a working fluid, for example, a capacity control valve that controls a discharge amount of a variable displacement compressor used for an air conditioning system of an automobile in accordance with pressure.

BACKGROUND ART

A variable displacement compressor used for an air conditioning system of an automobile, etc. includes a rotating shaft to be driven and rotated by an engine, a swash plate coupled to the rotating shaft in such a manner that a tilt angle is variable, compressing pistons coupled to the swash plate, etc., and by changing the tilt angle of the swash plate, changes a stroke amount of the pistons to control a discharge amount of a fluid. This tilt angle of the swash plate can be continuously changed by appropriately controlling pressure in a control chamber while utilizing suction pressure Ps of a suction chamber that suctions the fluid, discharge pressure Pd of a discharge chamber that discharges the fluid pressurized by the pistons, and control pressure Pc of the control chamber that houses the swash plate, with using a capacity control valve to be driven to open and close by electromagnetic force.

At the time of continuously driving the variable displacement compressor, the capacity control valve performs normal control in which energization is controlled by a control computer, a valve element is moved in the axial direction by electromagnetic force generated in a solenoid, and a main valve is opened and closed to adjust the control pressure Pc of the control chamber of the variable displacement compressor.

At the time of the normal control of the capacity control valve, the pressure of the control chamber in the variable displacement compressor is appropriately controlled, and by continuously changing the tilt angle of the swash plate with respect to the rotating shaft, the stroke amount of the pistons is changed to control the discharge amount of the fluid to the discharge chamber. Thus, the air conditioning system is adjusted to have a desired cooling ability.

The rod-shaped valve element is inserted into a guide hole slidably with respect to the guide hole, and a control port through which a control fluid of control pressure passes and a suction port through which a suction fluid of suction pressure passes are partitioned across a sliding region (see Patent Citation 1).

CITATION LIST

Patent Literature

Patent Citation 1: JP 2003-42062 A (PAGE 4, FIG. 2)

SUMMARY OF INVENTION

Technical Problem

In the capacity control valve of Patent Citation 1, by providing plural annular grooves on an outer peripheral surface of a shaft moved together with the valve element and forming a labyrinth seal between an inner peripheral surface of the guide hole and the outer peripheral surface of the shaft in the sliding region, the control fluid and the suction fluid are partitioned across the sliding region in a sealed manner. However, since contaminant, etc. coming in a clearance between the outer peripheral surface of the shaft and the inner peripheral surface of the guide hole sometimes remains in the sliding region, there is a fear that sliding resistance of the shaft with respect to the guide hole is increased and the valve element is not normally operated. When, in order to suppress contaminant, etc. from remaining in the sliding region, axial length of the sliding region is shortened and the clearance is enlarged to increase a flow rate of the fluid on the low-pressure side of the sliding region, there is a problem that an amount of the fluid leaked to the low-pressure side of the sliding region is increased and compression efficiency of the variable displacement compressor controlled by the capacity control valve is lowered.

The present invention is achieved focusing on such problems, and an object thereof is to provide a capacity control valve in which resistance to foreign substances can be enhanced while reducing leakage of a fluid to the low-pressure side of a sliding region.

Solution to Problem

In order to solve the foregoing problems, a capacity control valve according to the present invention is a capacity control valve including a valve housing provided with a discharge port through which a discharge fluid of discharge pressure passes, a suction port through which a suction fluid of suction pressure passes, and a control port through which a control fluid of control pressure passes, and a valve element configured to be brought into contact with and separated from a valve seat by a driving force of a solenoid to open and close a communication between the control port and the discharge port or a communication between the control port and the suction port, wherein a sliding region is formed by an inner peripheral surface of the valve housing and an outer peripheral surface of the valve element, a groove extending in a circumferential direction is formed in at least one of the inner peripheral surface of the valve housing and the outer peripheral surface of the valve element, and the sliding region has a structure in which a swirling current is generated in the groove by a fluid flowing from a high-pressure side to a low-pressure side in a clearance between the inner peripheral surface of the valve housing and the outer peripheral surface of the valve element. According to the aforementioned feature of the present invention, the swirling current is generated in the groove by the fluid flowing from the high-pressure side to the low-pressure side in the sliding region, and hence becomes a fluid resistance portion with respect to the fluid flowing in the axial direction from the high-pressure side to the low-pressure side in the sliding region, so that an amount of the fluid leaked from the high-pressure side to the low-pressure side of the sliding region can be reduced. Therefore, by shortening axial length of the sliding region and enlarging the clearance of the sliding region, a flow rate of the fluid flowing from the high-pressure side to the low-pressure side in the sliding region can be enhanced and while reducing leakage of the fluid to the low-pressure side of the sliding region, it is possible to suppress contaminant, etc. from remaining and accumulating in the sliding region to enhance resistance to foreign substances.

It may be preferable that a radial length of the clearance is within a range from $1/10$ to $1/300$ of an axial length of the sliding region. According to this preferable configuration, the swirling current is generated by the fluid flowing from the high-pressure side to the low-pressure side in the sliding region and it is possible to reduce the amount of the fluid leaked to the low-pressure side of the sliding region.

It may be preferable that the radial length of the clearance is within a range from 5 μm to 20 μm. According to this preferable configuration, the swirling current is generated by the fluid flowing from the high-pressure side to the low-pressure side in the sliding region and it is possible to reduce the amount of the fluid leaked to the low-pressure side of the sliding region.

It may be preferable that a depth of the groove is larger than the radial length of the clearance. According to this preferable configuration, since the fluid flowing from the high-pressure side to the low-pressure side in the clearance of the sliding region is reliably guided into the groove, the swirling current is more easily generated. In addition, since contaminant, etc. can be pulled into the groove by the swirling current, it is possible to prevent contaminant, etc. from remaining and accumulating in the clearance of the sliding region.

It may be preferable that the groove is exposed on the low-pressure side of the sliding region in a stroke range of the valve element. According to this preferable configuration, it is possible to discharge contaminant, etc. pulled into the groove to the low-pressure side of the sliding region.

It may be preferable that the groove extends so as to form a spiral shape, and a pitch of the groove for one roll from a groove inlet is longer than the axial length of the sliding region. According to this preferable configuration, since the groove is exposed on the low-pressure side of the sliding region by a short distance of one roll from the groove inlet, it is possible to more easily discharge contaminant, etc. pulled into the groove.

It may be preferable that the groove is a multiple-thread spiral groove. According to this preferable configuration, since the fluid flows according to the flow rate from the high-pressure side to the low-pressure side in the plural spiral grooves, contaminant, etc. pulled into the grooves is more easily discharged.

DESCRIPTION OF EMBODIMENTS

Modes for carrying out a capacity control valve according to the present invention will be described below based on embodiments.

First Embodiment

A capacity control valve according to a first embodiment of the present invention will be described with reference to FIGS. 1 to 6. Hereinafter, description will be given with the left and right sides seen from the front side of FIG. 2 being the left and right sides of the capacity control valve.

A capacity control valve V of the present invention is assembled into a variable displacement compressor M used for an air conditioning system of an automobile, etc. By variably controlling pressure of a working fluid (hereinafter, simply referred to as the "fluid") serving as a coolant, a discharge amount of the variable displacement compressor M is controlled and the air conditioning system is adjusted to have a desired cooling ability.

Figure 1:
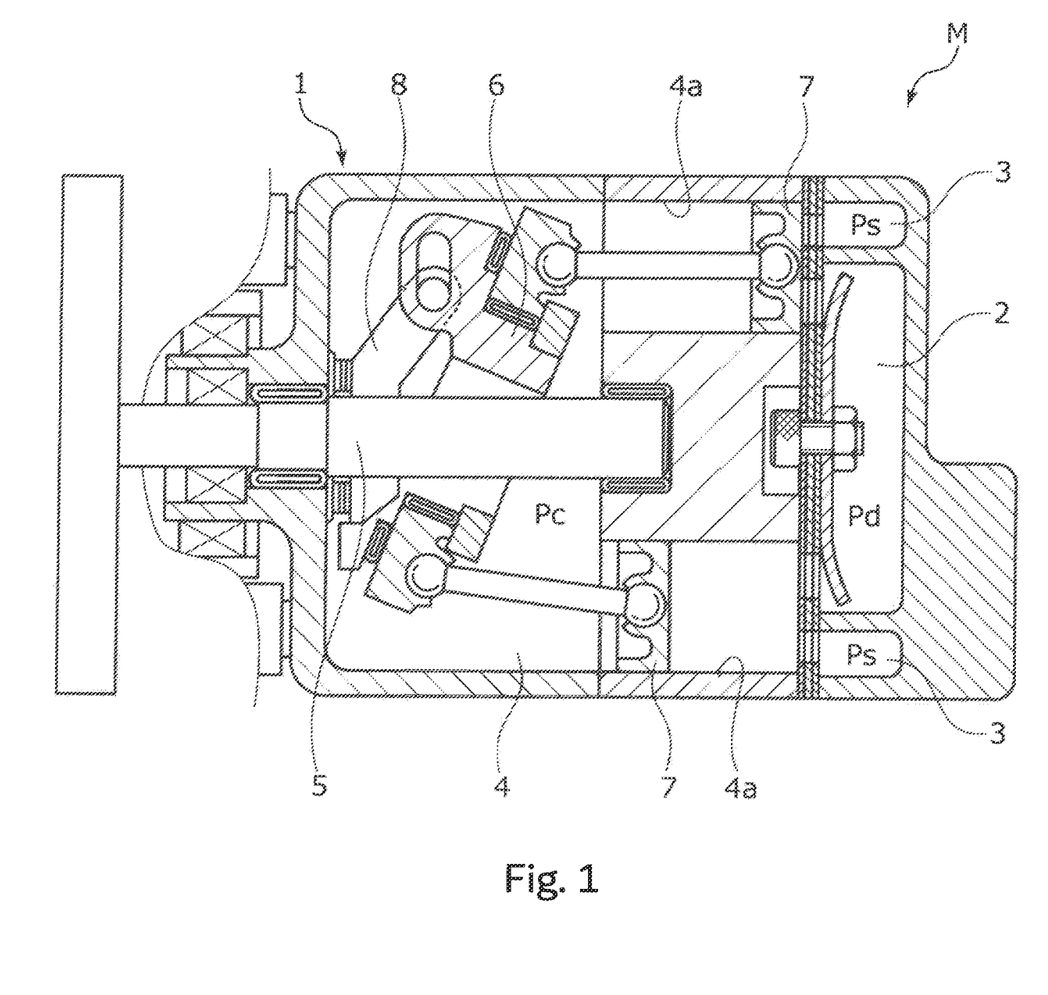
FIG. 1 is a schematic configuration diagram showing a swash plate type variable displacement compressor into which a capacity control valve according to a first embodiment of the present invention is assembled.

First of all, the variable displacement compressor M will be described. As shown in FIG. 1, the variable displacement compressor M has a casing 1 including a discharge chamber 2, a suction chamber 3, a control chamber 4, and plural cylinders 4a. A communication passage (not shown) providing direct communication between the control chamber 4 and the suction chamber 3 is provided in the variable displacement compressor M. A fixed orifice for adjusting to balance pressure between the suction chamber 3 and the control chamber 4 is provided in this communication passage.

The variable displacement compressor M also includes a rotating shaft 5 to be driven and rotated by an engine (not shown) installed outside the casing 1, a swash plate 6 coupled to the rotating shaft 5 in an eccentric state by a hinge mechanism 8 in the control chamber 4, and plural pistons 7 coupled to the swash plate 6 and fitted reciprocatably in the respective cylinders 4a. With using the capacity control valve V to be driven to open and close by electromagnetic force, a tilt angle of the swash plate 6 is continuously changed by appropriately controlling pressure in the control chamber 4 while utilizing suction pressure Ps of the suction chamber 3 that suctions the fluid, discharge pressure Pd of the discharge chamber 2 that discharges the fluid pressurized by the pistons 7, and control pressure Pc of the control chamber 4 that houses the swash plate 6. Thereby, a stroke amount of the pistons 7 is changed to control a discharge amount of the fluid. For convenience of description, the capacity control valve V assembled into the variable displacement compressor M is not shown in FIG. 1.

Specifically, the higher the control pressure Pc in the control chamber 4 is, the smaller the tilt angle of the swash plate 6 with respect to the rotating shaft 5 becomes, and the more the stroke amount of the pistons 7 is reduced. However, when the pressure becomes fixed pressure or more, the swash plate 6 is brought into a substantially perpendicular state with respect to the rotating shaft 5, that is, a state where the swash plate is slightly tilted from the exactly perpendicular state. At this time, the stroke amount of the pistons 7 becomes minimum, and pressurization of the fluid in the cylinders 4a by the pistons 7 becomes minimum. Therefore, the discharge amount of the fluid to the discharge chamber 2 is reduced, and the cooling ability of the air conditioning system becomes minimum. Meanwhile, the lower the control pressure Pc in the control chamber 4 is, the larger the tilt angle of the swash plate 6 with respect to the rotating shaft 5 becomes, and the more the stroke amount of the pistons 7 is increased. However, when the pressure becomes fixed pressure or less, the tilt angle of the swash plate 6 with respect to the rotating shaft 5 becomes maximum. At this time, the stroke amount of the pistons 7 becomes maximum, and the pressurization of the fluid in the cylinders 4a by the pistons 7 becomes maximum. Therefore, the discharge amount of the fluid to the discharge chamber 2 is increased, and the cooling ability of the air conditioning system becomes maximum.

Figure 2:
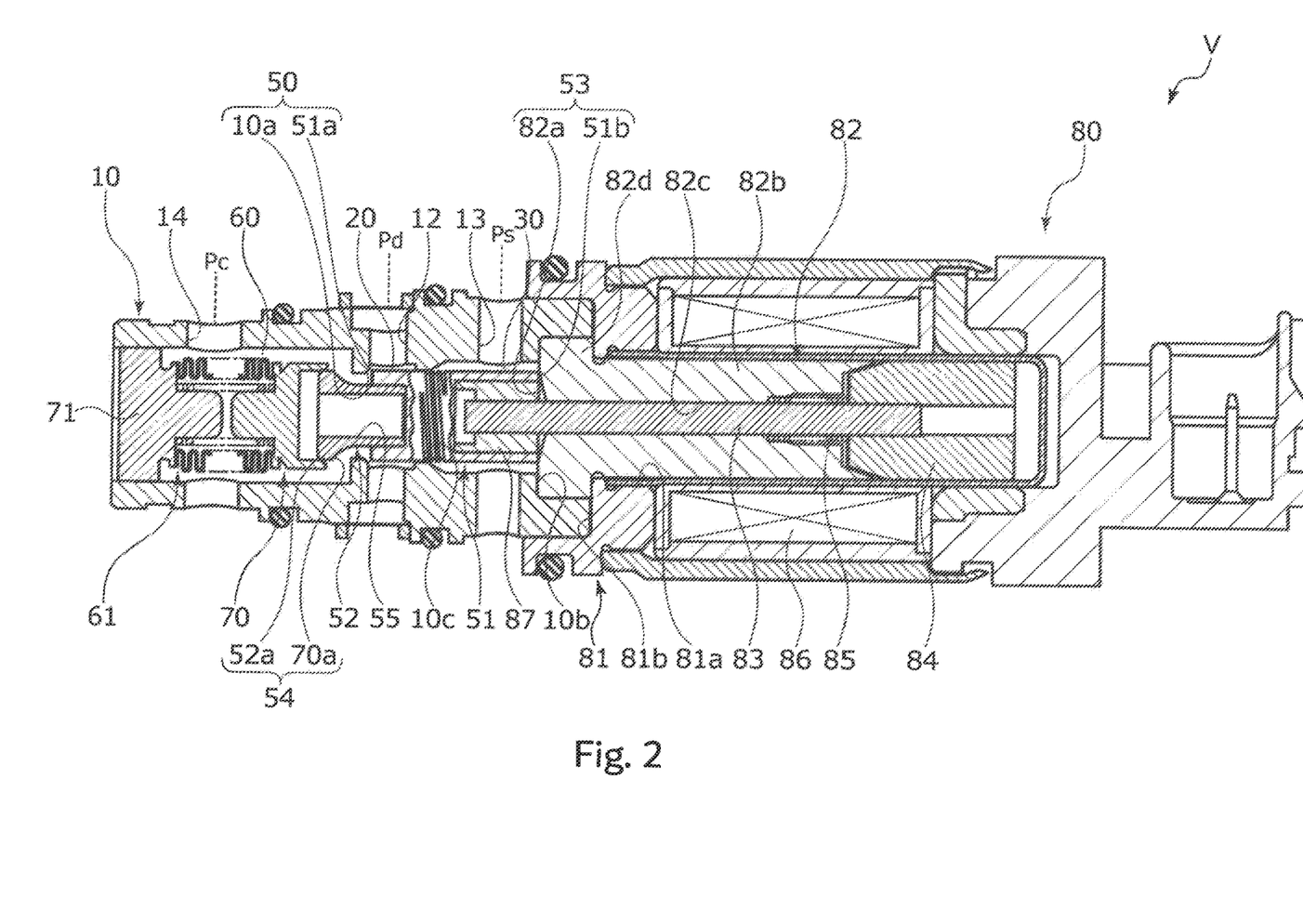
FIG. 2 is a sectional view showing a state where a main valve is opened and an auxiliary valve is closed in a non-energized state of the capacity control valve in the first embodiment.

As shown in FIG. 2, the capacity control valve V assembled into the variable displacement compressor M adjusts an electric current energized in a coil 86 forming a solenoid 80 and performs open/close control of a main valve 50 and an auxiliary valve 53 in the capacity control valve V, and also performs open/close control of a pressure sensitive valve 54 by suction pressure Ps in an intermediary communication passage 55, so that by controlling the fluid flowing into the control chamber 4 or flowing out from the control chamber 4, the control pressure Pc in the control chamber 4 is variably controlled. The intermediary communication passage 55 passes through over the axial direction by connecting a main/auxiliary valve element 51 serving as a valve element and a hollow hole formed inside a pressure sensitive valve member 52, and forms a flow passage for discharging a liquid coolant. In detail, partly due to liquefication of the fluid whose pressure is increased in the control chamber 4 by leaving the variable displacement compressor M in a stop state for a long time, but by closing the main valve 50 and opening the auxiliary valve 53 by start-up of the variable displacement compressor M and energization of the capacity control valve V, and further by contracting a pressure sensitive body 61 and opening the pressure sensitive valve 54 by high suction pressure Ps in the intermediary communication passage 55, the liquid coolant of the control chamber 4 can be discharged to the suction chamber 3 via the intermediary communication passage 55 for a short time.

In the present embodiment, the main valve 50 is formed by the main/auxiliary valve element 51 and a main valve seat 10a serving as a valve seat which is formed in a valve housing 10, and by bringing and separating an axially left end 51a of the main/auxiliary valve element 51 into contact with and from the main valve seat 10a, the main valve 50 is opened and closed. The auxiliary valve 53 is formed by the main/auxiliary valve element 51 and an auxiliary valve seat 82a formed on the inner diameter side of an axially left end surface which serves as an opening end surface of a fixed iron core 82, and by bringing and separating an axially right end 51b of the main/auxiliary valve element 51 into contact with and from the auxiliary valve seat 82a, the auxiliary valve 53 is opened and closed. The pressure sensitive valve 54 is formed by a cap 70 forming the pressure sensitive body 61 and an annular pressure sensitive valve seat 52a formed in an axially left end of the pressure sensitive valve member 52. By bringing and separating a sealing surface 70a formed on the outer diameter side of an axially right end of the cap 70 into contact with and from the pressure sensitive valve seat 52a, the pressure sensitive valve 54 is opened and closed.

Next, a structure of the capacity control valve V will be described. As shown in FIG. 2, the capacity control valve V is mainly formed by the valve housing 10 made of a metal material or a resin material, the main/auxiliary valve element 51 arranged reciprocatably in the axial direction in the valve housing 10, the pressure sensitive valve member 52, the pressure sensitive body 61 that applies axially rightward bias force to the main/auxiliary valve element 51 and the pressure sensitive valve member 52 in accordance with the suction pressure Ps in the intermediary communication passage 55, and the solenoid 80 connected to the valve housing 10, the solenoid that applies drive force to the main/auxiliary valve element 51 and the pressure sensitive valve member 52.

As shown in FIG. 2, the solenoid 80 is mainly formed by a casing 81 having an opening portion 81a which is open on the axially left side, the substantially cylindrical fixed iron core 82 inserted into the opening portion 81a of the casing 81 from the axially left side and fixed on the inner diameter side of the casing 81, a drive rod 83 inserted into the fixed iron core 82 reciprocatably in the axial direction, the drive rod whose axially left end portion is inserted and fixed to the main/auxiliary valve element 51, a movable iron core 84 to which an axially right end portion of the drive rod 83 is inserted and fixed, a coil spring 85 provided between the fixed iron core 82 and the movable iron core 84, the coil spring biasing the movable iron core 84 to the axially right side which is the valve opening direction of the main valve 50, and the excitation coil 86 wound on the outside of the fixed iron core 82 via a bobbin.

A recessed portion 81b in which the inner diameter side of an axially left end is recessed to the axially right side is formed in the casing 81. An axially right end portion of the valve housing 10 is inserted and fixed to this recessed portion 81b in a substantially sealed manner.

The fixed iron core 82 is made of a rigid body which is a magnetic material such as iron or silicon steel, and includes a cylindrical portion 82b extending in the axial direction, the cylindrical portion where an insertion hole 82c into which the drive rod 83 is inserted is formed, and an annular flange portion 82d extending in the outer diameter direction from an outer peripheral surface of an axially left end portion of the cylindrical portion 82b. The auxiliary valve seat 82a is formed on the inner diameter side of the opening end surface of the fixed iron core 82, that is, on an axially left end surface of the cylindrical portion 82b.

The fixed iron core 82 is inserted and fixed to a recessed portion 10b recessed to the axially left side on the inner diameter side of an axially right end of the valve housing 10 which is inserted and fixed to the recessed portion 81b of the casing 81 in a substantially sealed manner in a state where an axially right end surface of the flange portion 82d is abutted with a bottom surface of the recessed portion 81b of the casing 81.

Next, a structure of the valve housing 10 will be described. As shown in FIG. 2, a Pd port 12 serving as a discharge port which communicates with the discharge chamber 2 of the variable displacement compressor M, a Ps port 13 serving as a suction port which communicates with the suction chamber 3 of the variable displacement compressor M, and a Pc port 14 serving as a control port which communicates with the control chamber 4 of the variable displacement compressor M are formed in the valve housing 10.

The valve housing 10 is formed in a substantially cylindrical bottomed shape by press-fitting a partition adjusting member 71 to an axially left end portion in a substantially sealed manner. The partition adjusting member 71 can adjust the bias force of the pressure sensitive body 61 by adjusting an installment position of the valve housing 10 in the axial direction.

A first valve chamber 20 communicating with the Pd port 12 where an axially left end portion of the main/auxiliary valve element 51 is arranged, a second valve chamber 30 communicating with the Ps port 13 where an axially right end portion of the main/auxiliary valve element 51 is arranged, and a pressure sensitive chamber 60 communicating with the Pc port 14 where the pressure sensitive body 61 is arranged are formed inside the valve housing 10.

Figure 3:
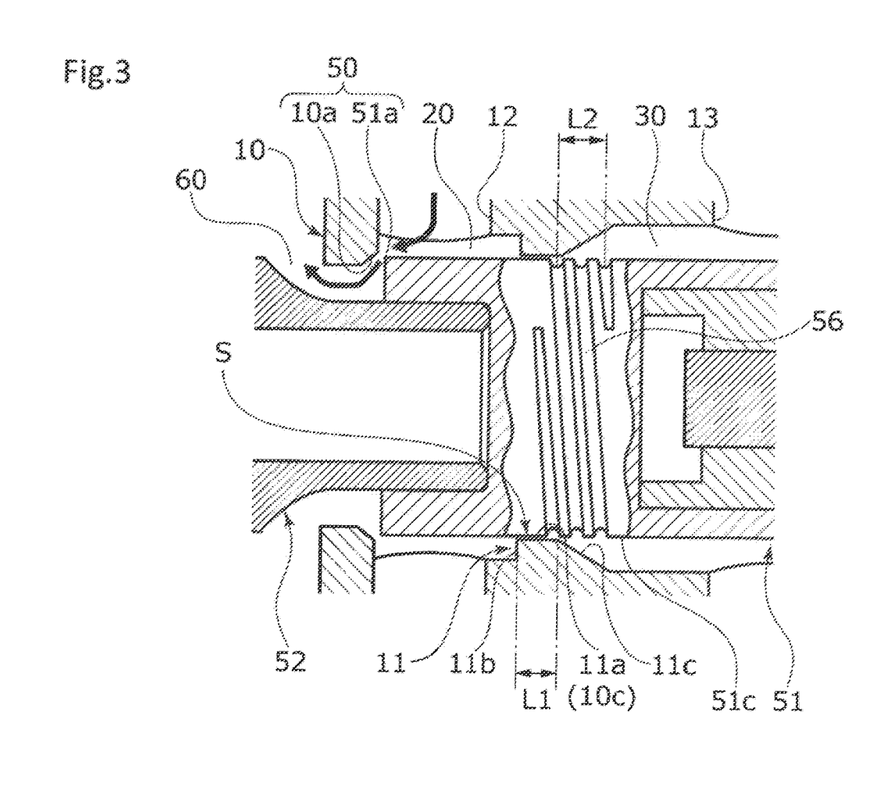
FIG. 3 is an enlarged sectional view of FIG. 2 showing a sliding region formed between an outer peripheral surface of a main/auxiliary valve element and an inner peripheral surface of a valve housing in the non-energized state of the capacity control valve in the first embodiment.
Figure 4:
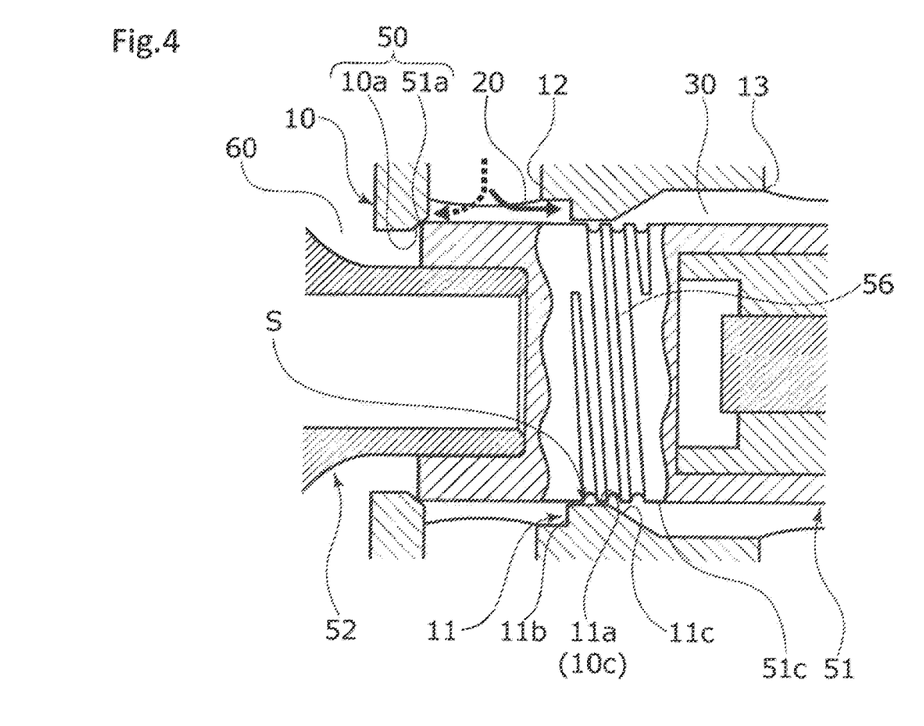
FIG. 4 is an enlarged sectional view showing the sliding region formed between the outer peripheral surface of the main/auxiliary valve element and the inner peripheral surface of the valve housing in an energized state of the capacity control valve in the first embodiment.

As shown in FIGS. 3 and 4, the main/auxiliary valve element 51 and the pressure sensitive valve member 52 connected to this main/auxiliary valve element 51 are arranged reciprocatably in the axial direction inside the valve housing 10. An annular projected portion 11 projecting in the inner diameter direction from a part between the Pd port 12 and the Ps port 13 in the axial direction is provided on an inner peripheral surface of the valve housing 10, and a small-diameter guide hole 10c on which an outer peripheral surface 51c of the main/auxiliary valve element 51 is slidable is formed by an inner peripheral surface 11a of this projected portion 11. The projected portion 11 is formed to have a trapezoidal section by the inner peripheral surface 11a forming the guide hole 10c on which the outer peripheral surface 51c of the main/auxiliary valve element 51 is slidable and extending along the axial direction, a side surface 11b extending orthogonally to the axial direction on the side of the first valve chamber 20, and a tapered side surface 11c whose diameter is gradually increased to the axially right side on the side of the second valve chamber 30.

In such a way, inside the valve housing 10, the first valve chamber 20 and the second valve chamber 30 are partitioned in a sealed manner by the outer peripheral surface 51c of the main/auxiliary valve element 51 and the inner peripheral surface 11a of the projected portion 11 forming the guide hole 10c, both the surfaces extending in parallel in the axial direction. A tiny clearance C (see FIG. 6A) is formed between the outer peripheral surface 51c of the main/auxiliary valve element 51 and the inner peripheral surface 11a of the projected portion 11 forming the guide hole 10c by slightly separating the surfaces from each other in the radial direction. The main/auxiliary valve element 51 is smoothly relatively movable in the axial direction with respect to the valve housing 10.

In the present embodiment, a part in which the inner peripheral surface 11a of the projected portion 11 forming the guide hole 10c and the outer peripheral surface 51c of the main/auxiliary valve element 51 slide with each other will be described as a sliding region S. Axial length L1 of the sliding region S corresponds to axial length of the inner peripheral surface 11a of the projected portion 11 forming the guide hole 10c. The axial length L1 of the sliding region S in the present embodiment is set to be 0.3 mm, and radial length of the clearance C is set to be 10 μm. That is, the radial length of the clearance C is formed within a range from 1/10 to 1/300 of the axial length L1 of the sliding region S. The axial length L1 of the sliding region S is preferably within a range from 0.2 mm to 1.5 mm, and the radial length of the clearance C is preferably within a range from 5 μm to 20 μm.

As shown in FIG. 4, in an energized state of the capacity control valve V, the main/auxiliary valve element 51 is moved to the axially left side by the drive force of the solenoid 80, the axially left end 51a of the main/auxiliary valve element 51 is seated on the main valve seat 10a formed in the valve housing 10, and the main valve 50 is closed, so that a flow of the fluid running from the first valve chamber 20 to the pressure sensitive chamber 60 is blocked (see a dotted arrow of FIG. 4). Thus, a flow of the fluid running to the sliding region S is generated by a pressure difference (Pd>Ps) between the inside of the first valve chamber 20 to which the discharge pressure Pd is supplied form the Pd port 12 and the inside of the second valve chamber 30 to which the suction pressure Ps is supplied from the Ps port 13 (see a solid arrow of FIG. 4). As shown in FIG. 3, in a non-energized state of the capacity control valve V, by separating the axially left end 51a of the main/auxiliary valve element 51 from the main valve seat 10a formed in the valve housing 10 and opening the main valve 50, the first valve chamber 20 communicates with the pressure sensitive chamber 60 to which the control pressure Pc is supplied from the Pc port 14, and the fluid flows from the first valve chamber 20 to the pressure sensitive chamber 60 by a pressure difference (Pd>Pc) between the inside of the first valve chamber 20 and the inside of the pressure sensitive chamber 60 (see a solid arrow of FIG. 3). Thus, the pressure difference between the inside of the first valve chamber 20 and the inside of the second valve chamber 30 is decreased, and the flow of the fluid running to the sliding region S is substantially not generated.

Next, a structure of the main/auxiliary valve element 51 will be described. As shown in FIG. 2, the main/auxiliary valve element 51 is formed in a cylindrical shape. The axially left end portion of the drive rod 83 forming the solenoid 80 is inserted and fixed to the axially right end portion of the main/auxiliary valve element 51 via an adapter 87, and the pressure sensitive valve member 52 of a separate body formed in a substantially cylindrical shape and a substantially artillery battery shape when seen from the side is inserted and fixed to the axially left end portion of the main/auxiliary valve element 51 in a substantially sealed manner. Both are movable in the axial direction.

Figure 5:
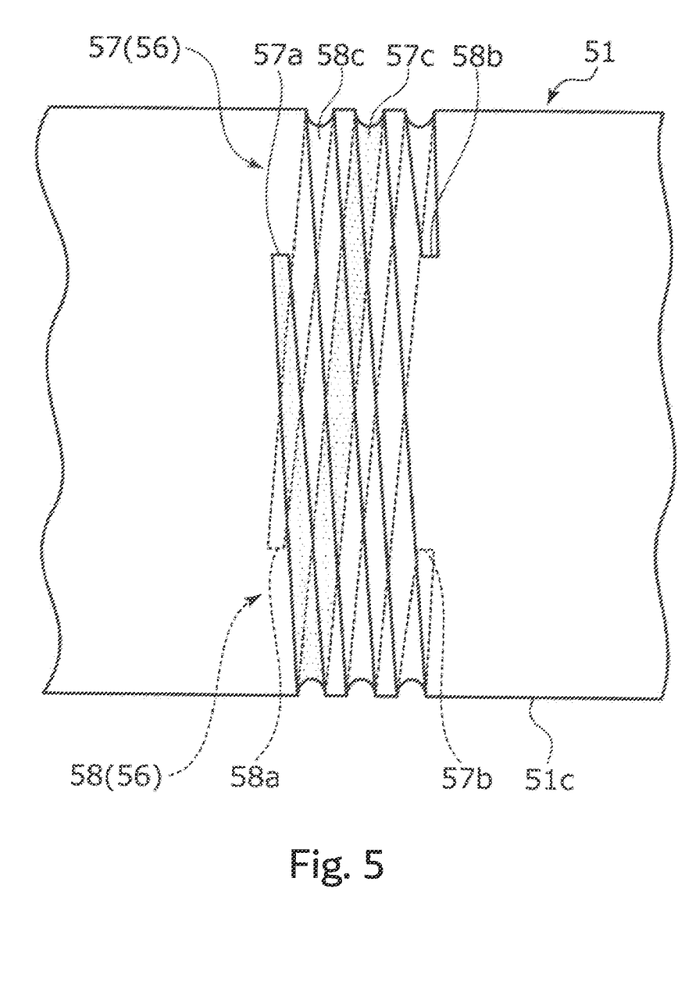
FIG. 5 is an explanatory view showing a structure of a groove formed on the outer peripheral surface of the main/auxiliary valve element in the first embodiment.

As shown in FIGS. 3 to 5, a groove 56 is formed on the outer peripheral surface 51c of the main/auxiliary valve element 51. The groove 56 is formed by two threads of spiral grooves 57, 58 each of which extends on the outer peripheral surface 51c of the main/auxiliary valve element 51 for one and a half rolls while being tilted in the axial direction, the spiral grooves whose circumferential phases are displaced from each other by 180 degrees. That is, the groove 56 is formed as a so-called two-thread spiral groove. The spiral grooves 57, 58 are not limited to the grooves extending on the outer peripheral surface 51c of the main/auxiliary valve element 51 for one and a half rolls but may be freely formed with the number of rolls of the spiral grooves 57, 58. However, in order to form the groove 56 in an annular shape, the number is preferably one or more. Further, the groove 56 is not limited to the groove formed as a two-thread spiral groove but the groove 56 may be formed by three or more threads of spiral grooves as a so-called multiple-thread spiral groove. Regarding the main/auxiliary valve element 51 in FIGS. 2 to 4, part of the outer peripheral surface 51*c* is shown in order to illustrate the groove 56. For convenience of description, in the figures, one of the spiral grooves may be dotted in order to distinguish between the two threads of the spiral grooves.

As shown in FIG. 5 in particular, groove sections of the spiral grooves 57, 58 are formed in a substantially isosceles trapezoid, width of the grooves is set within a range from 50 μm to 500 μm, depth is set within a range from 50 μm to 500 μm, a pitch is respectively set within a range from 0.3 mm to 2.0 mm, and a tilt angle of a groove side surface with respect to the axial direction is set within a range from not less than 45 degrees to less than 90 degrees. The depth of the spiral grooves 57, 58 is larger than the radial length of the clearance C in the sliding region S. Further, a shape of the groove sections of the spiral grooves 57, 58 is not limited to the substantially isosceles trapezoid but may be other shapes such as a trapezoid in which the tilt angle of the groove side surface is different, a rectangle, an arc, or a triangle.

In the spiral grooves 57, 58, groove inlets 57*a*, 58*a* serving as axially left ends and groove outlets 57*b*, 58*b* serving as axially right ends are respectively formed at the axially same positions on the outer peripheral surface 51*c* of the main/auxiliary valve element 51. In the spiral grooves 57, 58, roll portions 57*c*, 58*c* between the groove inlets 57*a*, 58*a* and the groove outlets 57*b*, 58*b* have the same extension size, and axial length L2 of a pitch for one roll (see FIG. 3) is also the same. As shown in FIG. 3, the axial length L2 of the pitch for one roll of the spiral grooves 57, 58 is longer than the axial length L1 of the sliding region S (L2>L1).

As shown in FIGS. 3 and 4, in a stroke range of the main/auxiliary valve element 51, the groove inlets 57*a*, 58*a* of the spiral grooves 57, 58 are positioned in the sliding region S, and the groove outlets 57*b*, 58*b* are exposed at positions axially corresponding to the tapered side surface 11*c* in the projected portion 11 of the valve housing 10, that is, in the second valve chamber 30 on the low-pressure side of the sliding region S. The groove outlets 57*b*, 58*b* are not limited to the groove outlets always exposed in the second valve chamber 30 but may be formed, for example, in such a manner that the groove outlets 57*b*, 58*b* are exposed from the inside of the sliding region S into the second valve chamber 30 by a stroke of the main/auxiliary valve element 51 according to the capacity control valve V being controlled from the energized state into the non-energized state.

Figure 6A:
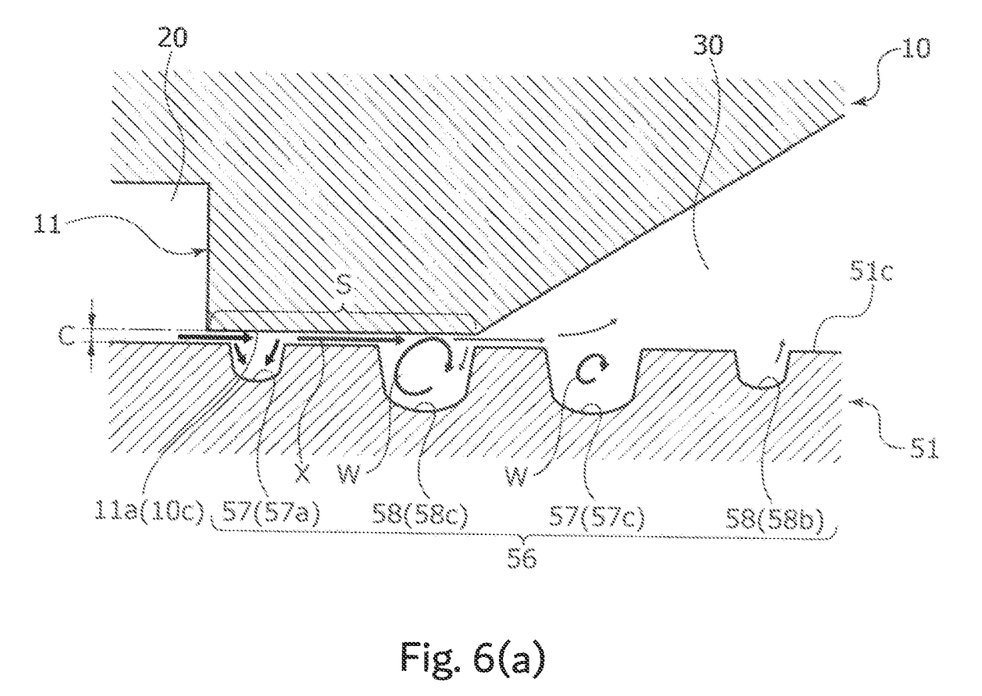
FIG. 6A is a view for explaining a state where a swirling current is generated in the groove by a fluid flowing from the high-pressure side to the low-pressure side in the sliding region in the energized state of the capacity control valve in the first embodiment.

As described above, by forming the groove 56 formed by the two threads of the spiral grooves 57, 58 tilted in the axial direction on the outer peripheral surface 51*c* of the main/ auxiliary valve element 51, as shown in FIG. 6A, by the fluid flowing from the first valve chamber 20 on the high-pressure side to the second valve chamber 30 on the low-pressure side in the sliding region S, a swirling current W along the groove sections of the spiral grooves 57, 58 are formed over the circumferential direction of the outer peripheral surface 51*c* of the main/auxiliary valve element 51, and hence becomes a fluid resistance portion with respect to the fluid flowing in the axial direction from the high-pressure side to the low-pressure side in the sliding region S, so that an amount of the fluid leaked from the high-pressure side to the low-pressure side of the sliding region S can be reduced. Therefore, by shortening the axial length L1 of the sliding region S and enlarging the clearance C of the sliding region S, by the swirling current W, while reducing the amount of the fluid leaked to the low-pressure side of the sliding region S, it is possible to suppress contaminant, etc. from remaining and accumulating in the sliding region S to enhance resistance to foreign substances. Since the swirling current W is generated by optimizing the axial length L1 of the sliding region S and the clearance C of the sliding region S, it is possible to reduce the amount of the fluid leaked to the low-pressure side of the sliding region S. Since part of the swirling current W formed in the spiral grooves 57, 58 comes over to the clearance C out of the spiral grooves 57, 58, the swirling current interferes as the fluid resistance portion against an axial flow X flowing in the axial direction from the high-pressure side to the low-pressure side in the clearance C of the sliding region S.

Figure 6B:
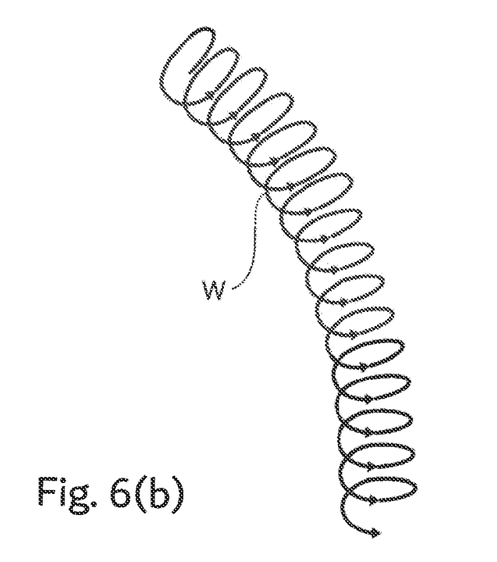
FIG. 6B is a schematic view showing the swirling current flowing from the high-pressure side to the low-pressure side in the groove in the first embodiment.

As shown in FIG. 6B, the swirling current W flowing from the groove inlets 57*a*, 58*a* of the spiral grooves 57, 58 to the groove outlets 57*b*, 58*b* in the spiral grooves 57, 58 forms a tornado flow consisting of a component which runs along outlines of the groove sections of the spiral grooves 57, 58 and a component which runs along the extending direction of the spiral grooves 57, 58. Thus, the swirling current W is formed stably over the circumferential direction of the outer peripheral surface 51*c* of the main/auxiliary valve element 51.

The clearance C of the sliding region S is formed to extend in parallel to the axial direction by the outer peripheral surface 51*c* of the main/auxiliary valve element 51 extending in parallel in the axial direction and the inner peripheral surface 11*a* of the projected portion 11 forming the guide hole 10*c*. Thus, in the sliding region S, it is possible to more easily generate the swirling current W in the spiral grooves 57, 58.

On the outer peripheral surface 51*c* of the main/auxiliary valve element 51 in the sliding region S, by forming the spiral grooves 57, 58 whose depth is larger than the radial length of the clearance C of the sliding region S, the fluid flowing from the high-pressure side to the low-pressure side in the clearance C of the sliding region S is reliably guided into the roll portions 57*c*, 58*c* of the spiral grooves 57, 58. Thus, since the swirling current W is more easily generated and contaminant, etc. coming into the sliding region S together with the fluid can be pulled into the spiral grooves 57, 58 by the swirling current W, it is possible to prevent contaminant, etc. from remaining and accumulating in the clearance C of the sliding region S to enhance resistance to foreign substances.

As shown in FIGS. 3 and 4, in the stroke range of the main/auxiliary valve element 51, the groove inlets 57*a*, 58*a* of the spiral grooves 57, 58 are positioned in the sliding region S, and the groove outlets 57*b*, 58*b* are exposed in the second valve chamber 30 on the low-pressure side of the sliding region S. Thus, contaminant, etc. pulled into the spiral grooves 57, 58 by the swirling current W is more easily discharged to the second valve chamber 30. Not all contaminant, etc. pulled into the spiral grooves 57, 58 is discharged from the groove outlets 57*b*, 58*b* to the second valve chamber 30. However, as shown in FIG. 6A, for example, in the roll portion 57*c* of the spiral groove 57 positioned out of the sliding region S and exposed in the second valve chamber 30, the force of the swirling current W is weakened. Thus, part of contaminant, etc. pulled into the spiral grooves 57, 58 is sometimes discharged from the roll portions 57*c*, 58*c* to the second valve chamber 30.

By forming the groove 56 by the two threads of the spiral grooves 57, 58 as the so-called multiple-thread spiral groove, the fluid flows from the high-pressure side to the low-pressure side according to a flow rate in the plural spiral grooves 57, 58. Thus, contaminant, etc. pulled into the spiral grooves 57, 58 is more easily discharged. Since the plural groove inlets 57a, 58a and the plural groove outlets 57b, 58b are formed, the fluid is more easily introduced into the groove 56 and the swirling current W is easily generated. Since contaminant, etc. can be dispersed over the plural spiral grooves 57, 58, it is possible to prevent contaminant, etc. from remaining and accumulating in the spiral grooves 57, 58. Further, since the groove 56 is the two-thread spiral groove formed by the two threads of the spiral grooves 57, 58, the axial length L2 of the pitch for one roll of the spiral grooves 57, 58 can be respectively shortened. Thus, it is possible to more shorten the axial length L1 of the sliding region S (i.e., L2>L1).

The groove inlets 57a, 58a of the spiral grooves 57, 58 are positioned in the sliding region S, and not exposed in the first valve chamber 20 on the high-pressure side of the sliding region S. Thus, the first valve chamber 20 and the second valve chamber 30 do not directly communicate with each other by the spiral grooves 57, 58, and leakage of the fluid to the second valve chamber 30 on the low-pressure side of the sliding region S is reduced. The axial length L2 of the pitch for one roll of the spiral grooves 57, 58 forming the groove 56 is longer than the axial length L1 of the sliding region S. Thus, in a state where the groove inlets 57a, 58a are positioned in the sliding region S, it is possible to reliably expose the groove outlets 57b, 58b and part of the roll portions 57c, 58c in the second valve chamber 30 on the low-pressure side of the sliding region S. In the spiral grooves 57, 58, part of the roll portions 57c, 58c are exposed in the second valve chamber 30 on the low-pressure side of the sliding region S by a short distance of one roll from the groove inlets 57a, 58a. Thus, it is possible to more easily discharge contaminant, etc. pulled into the spiral grooves 57, 58.

Since the groove 56 is formed on the outer peripheral surface 51c of the main/auxiliary valve element 51, processing for forming the groove 56 is easily performed.

The plural spiral grooves forming the groove 56 are not limited to the spiral grooves formed by the same configurations but spiral grooves having different sectional shapes, width, depth, extension size, etc. may be combined.

By forming width of the groove outlets 57b, 58b of the spiral grooves 57, 58 larger than width of the groove inlets 57a, 58a, contaminant, etc. pulled into the spiral grooves 57, 58 by the swirling current W may be more easily discharged from the groove outlets 57b, 58b to the second valve chamber 30.

Second Embodiment

Figure 7:
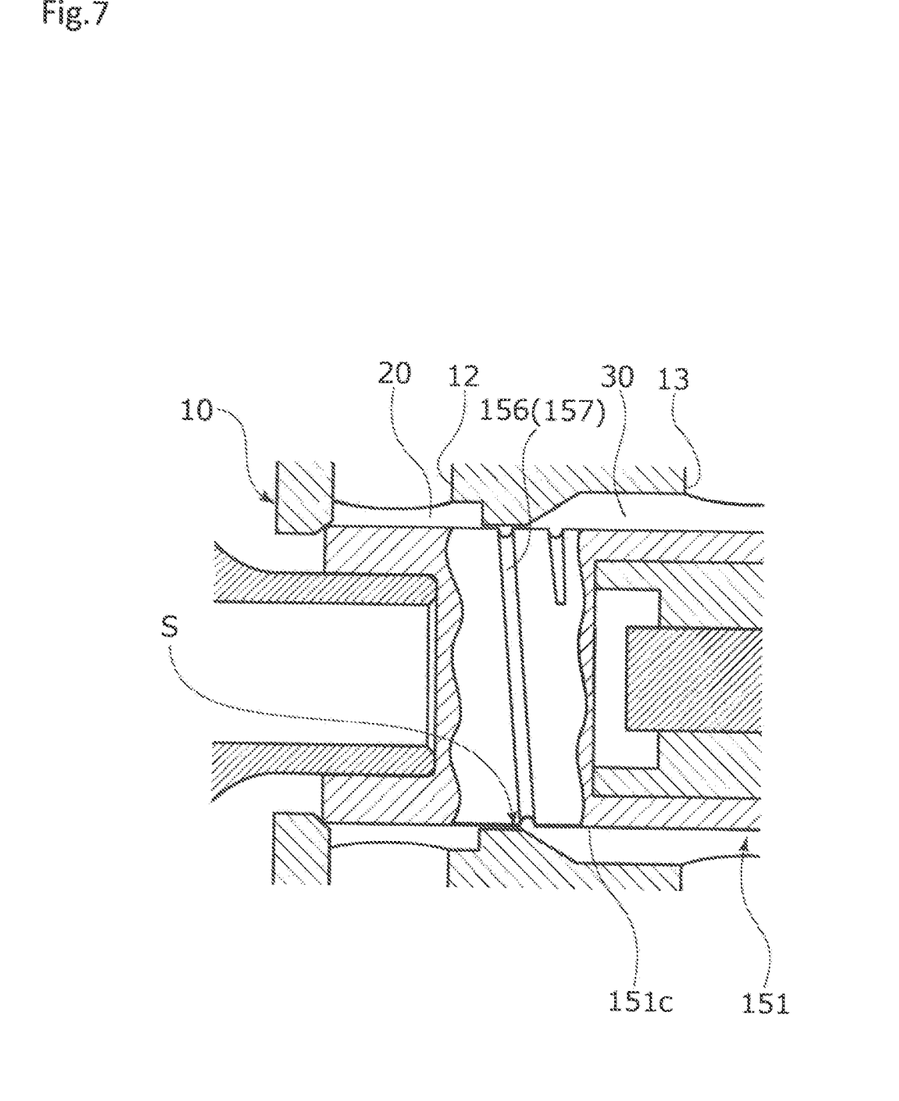
FIG. 7 is an enlarged sectional view showing a sliding region formed between an outer peripheral surface of a main/auxiliary valve element and an inner peripheral surface of a valve housing in an energized state of a capacity control valve according to a second embodiment of the present invention.

Next, a capacity control valve according to a second embodiment of the present invention will be described with reference to FIG. 7. The same constituent parts as the constituent parts shown in the first embodiment will be given the same reference signs and duplicated description will be omitted.

A capacity control valve V in the second embodiment will be described. As shown in FIG. 7, in the second embodiment, a groove 156 is formed on an outer peripheral surface 151c of a main/auxiliary valve element 151 serving as a valve element. The groove 156 is formed by one thread of a spiral groove 157 extending on the outer peripheral surface 151c of the main/auxiliary valve element 151 for one and a half rolls while being tilted in the axial direction as a so-called single-thread spiral groove. According to this, the groove 156 is formed as the single-thread spiral groove on the outer peripheral surface 151c of the main/auxiliary valve element 151. Thus, processing for forming the groove 156 is easily performed.

Third Embodiment

Figure 8:
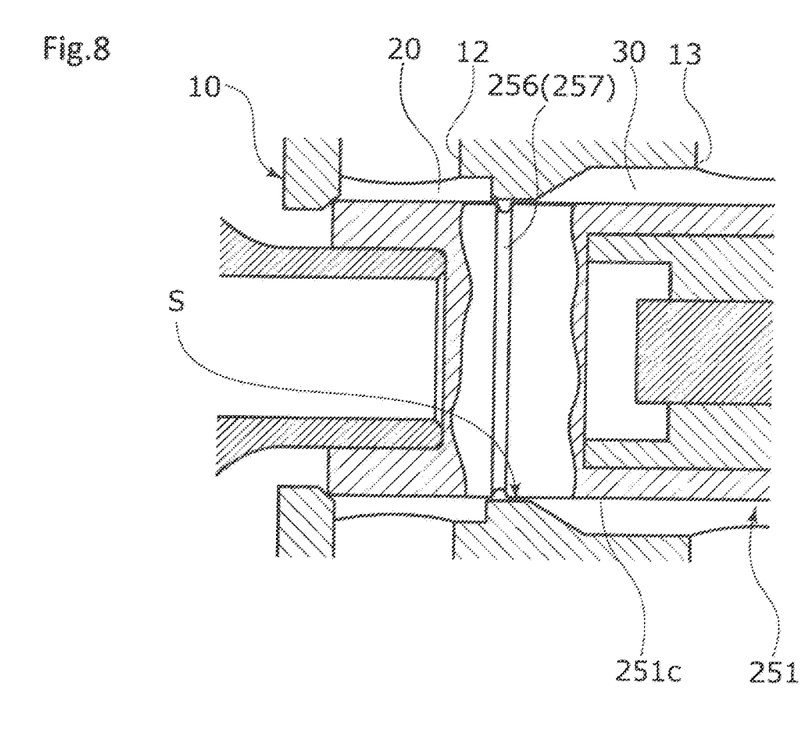
FIG. 8 is an enlarged sectional view showing a sliding region formed between an outer peripheral surface of a main/auxiliary valve element and an inner peripheral surface of a valve housing in an energized state of a capacity control valve according to a third embodiment of the present invention.

Next, a capacity control valve according to a third embodiment of the present invention will be described with reference to FIG. 8. The same constituent parts as the constituent parts shown in the first embodiment will be given the same reference signs and duplicated description will be omitted.

A capacity control valve V in the third embodiment will be described. As shown in FIG. 8, in the third embodiment, a groove 256 is formed on an outer peripheral surface 251c of a main/auxiliary valve element 251 serving as a valve element. The groove 256 is formed by an endless annular groove 257 extending on the outer peripheral surface 251c of the main/auxiliary valve element 251 for one roll. According to this, a fluid less easily flows along the extending direction of the groove 256, and it is possible to reduce an amount of the fluid leaked to a second valve chamber 30 from a sliding region S. In a non-energized state of the capacity control valve V, at the time of moving the main/auxiliary valve element 251 to the axially right side, by forming in such a manner that at least part of the annular groove 257 is exposed in the second valve chamber 30 on the low-pressure side of the sliding region S, contaminant, etc. pulled in the annular groove 257 by a swirling current W (see FIG. 6) may be more easily discharged to the second valve chamber 30.

The plural annular grooves 257 forming the groove 256 may be provided in the axial direction.

Fourth Embodiment

Next, a capacity control valve according to a fourth embodiment of the present invention will be described with reference to FIG. 9. The same constituent parts as the constituent parts shown in the first embodiment will be given the same reference signs and duplicated description will be omitted.

A capacity control valve V in the fourth embodiment will be described. As shown in FIG. 9, in the fourth embodiment, an outer peripheral surface 351c of a main/auxiliary valve element 351 serving as a valve element is formed in a flat curved surface, and no grooves are provided on this curved surface.

Figure 9:
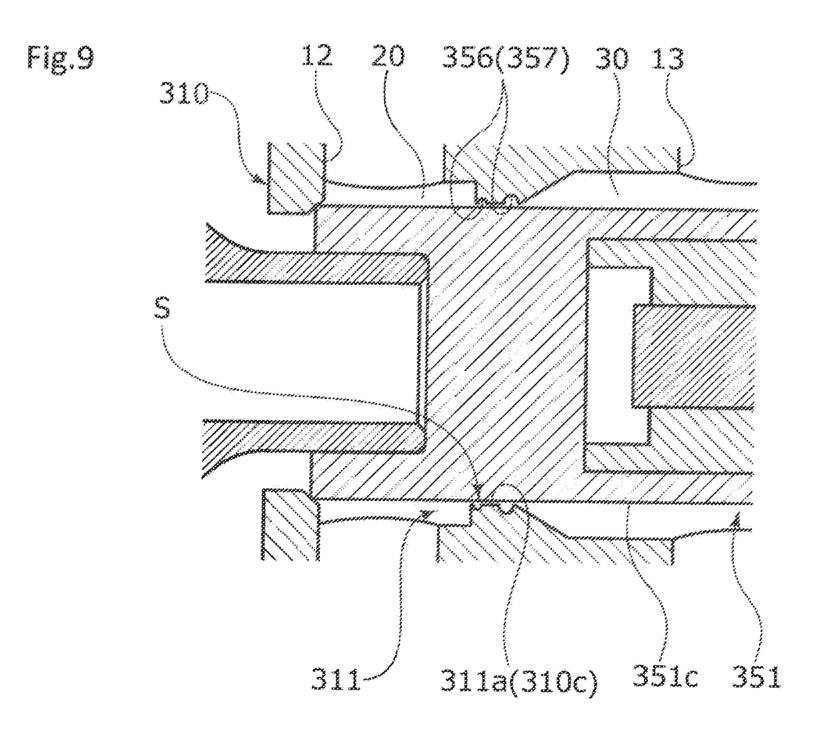
FIG. 9 is an enlarged sectional view showing a sliding region formed between an outer peripheral surface of a main/auxiliary valve element and an inner peripheral surface of a valve housing in an energized state of a capacity control valve according to a fourth embodiment of the present invention.

As shown in FIG. 9, an annular projected portion 311 projecting in the inner diameter direction from a part between a Pd port 12 and a Ps port 13 in the axial direction is provided on an inner peripheral surface of a valve housing 310, and a small-diameter guide hole 310c on which the outer peripheral surface 351c of the main/auxiliary valve element 351 is slidable is formed by an inner peripheral surface 311a of this projected portion 311. A groove 356 is formed on the inner peripheral surface 311a of the projected portion 311. The groove 356 is formed by one thread of a spiral groove 357 extending on the inner peripheral surface 311a of the projected portion 311 for one and a half rolls while being tilted in the axial direction as a so-called single-thread spiral groove. The groove 356 formed on the inner peripheral surface 311a of the projected portion 311 is not limited to the groove formed by a single-thread spiral groove but may be formed by a multiple-thread spiral groove such as two threads of spiral grooves as in the first embodiment, or an endless annular groove as in the third embodiment.

The embodiments of the present invention are described above with the drawings. However, specific configurations are not limited to these embodiments but the present invention includes changes and additions within the range not departing from the scope of the present invention.

For example, in the above embodiments, the auxiliary valve 53 is not necessarily provided. An axially right end of the main/auxiliary valve element is only required to function as a support member that receives a load in the axial direction and a sealing function is not necessarily required.

The example in which the main/auxiliary valve element and the pressure sensitive valve member 52 are formed as separate bodies is described. However, both may be integrated. The example in which the drive rod 83 and the main/auxiliary valve element are formed as separate bodies is described. However, both may be integrated. Further, the main/auxiliary valve element, the pressure sensitive valve member 52, and the drive rod 83 may be integrated.

The communication passage providing direct communication between the control chamber 4 and the suction chamber 3 of the variable displacement compressor M and the fixed orifice are not necessarily provided.

The groove may be formed by combining spiral grooves as in the first embodiment or the second embodiment and an annular groove as in the third embodiment. Grooves may be formed on both the outer peripheral surface of the main/auxiliary valve element and the inner peripheral surface of the valve housing.

The projected portion provided on the inner peripheral surface of the valve housing may not have the tapered side surface but may be formed to have a rectangular section.

The main/auxiliary valve element is not limited to the main/auxiliary valve element formed to have the same diameter over the axial direction but may be a main/auxiliary valve element whose diameter is partly reduced but not in a range where the groove is formed. In this case, the axial length of the sliding region may be shorter than the axial length of the inner peripheral surface of the projected portion forming the guide hole of the valve housing.

In the present invention, the valve element has functions of reciprocating in the axial direction by the drive force of the solenoid, sliding with the guide hole of the valve housing, and being brought into contact with or separated from the main valve seat. In the first to fourth embodiments, the main/auxiliary valve element is described as an example. However, for example, as long as the drive rod in the first to fourth embodiments slides with the guide hole of the valve housing, the drive rod forms the valve element together with the main/auxiliary valve element.

REFERENCE SIGNS LIST

1 Casing
2 Discharge chamber
3 Suction chamber
4 Control chamber
5 Valve housing
10a Main valve seat (valve seat)
10c Guide hole
11 Projected portion
11a Inner peripheral surface
12 Pd port (discharge port)
13 Ps port (suction port)
14 Pc port (control port)
15 First valve chamber
20 Second valve chamber
50 Main valve
51 Main/auxiliary valve element (valve element)
51c Outer peripheral surface
56 Groove
57, 58 Spiral groove
57a, 58a Groove inlet
57b, 58b Groove outlet
57c, 58c Roll portion
60 Pressure sensitive chamber
61 Pressure sensitive body
80 Solenoid
151 Main/auxiliary valve element (valve element)
151c Outer peripheral surface
156 Groove
157 Spiral groove
251 Main/auxiliary valve element (valve element)
251c Outer peripheral surface
256 Groove
257 Annular groove
310 Valve housing
310c Guide hole
311 Projected portion
311a Inner peripheral surface
351 Main/auxiliary valve element (valve element)
351c Outer peripheral surface
356 Groove
357 Spiral groove
C Clearance
S Sliding region
V Capacity control valve
W Swirling current
X Axial flow

The invention claimed is:

1. A capacity control valve comprising: a valve housing provided with a discharge port through which a discharge fluid of discharge pressure passes, a suction port through which a suction fluid of suction pressure passes, and a control port through which a control fluid of control pressure passes; and a valve element configured to be brought into contact with and separated from a valve seat by a driving force of a solenoid to open and close a communication between the control port and the discharge port or a communication between the control port and the suction port, wherein a sliding region is formed by an inner peripheral surface of the valve housing and an outer peripheral surface of the valve element, a groove extending in a circumferential direction is formed in at least one of the inner peripheral surface of the valve housing and the outer peripheral surface of the valve element, the sliding region has a structure in which a swirling current is generated in the groove by a fluid flowing from a high-pressure side to a low-pressure side in a clearance between the inner peripheral surface of the valve housing and the outer peripheral surface of the valve element, the radial length of the clearance is within a range from 5 μm to 19 μm, and the groove includes at least two threads of spiral grooves.

2. The capacity control valve according to claim 1, wherein
a radial length of the clearance is within a range from 1/10 to 1/300 of an axial length of the sliding region.

3. The capacity control valve according to claim 2, wherein
a depth of the groove is larger than the radial length of the clearance.

4. The capacity control valve according to claim 1, wherein
   the groove is exposed on the low-pressure side of the sliding region in a stroke range of the valve element.

5. The capacity control valve according to claim 4, wherein
   the groove extends so as to form a spiral shape, and a pitch of the groove for one roll from a groove inlet is longer than the axial length of the sliding region.

6. The capacity control valve according to claim 2, wherein
   the groove is exposed on the low-pressure side of the sliding region in a stroke range of the valve element.

7. The capacity control valve according to claim 6, wherein
   the groove extends so as to form a spiral shape, and a pitch of the groove for one roll from a groove inlet is longer than the axial length of the sliding region.

8. The capacity control valve according to claim 1, wherein the groove is a multiple spiral groove.

* * * * *